March 22, 1949.  T. BRAGDON ET AL  2,465,007
AIRCRAFT PROPELLER
Filed Jan. 5, 1944  2 Sheets—Sheet 1
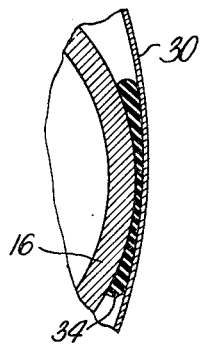
Fig.13
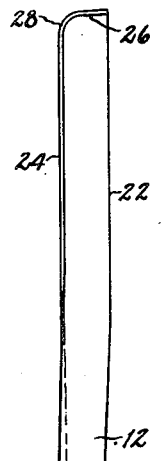
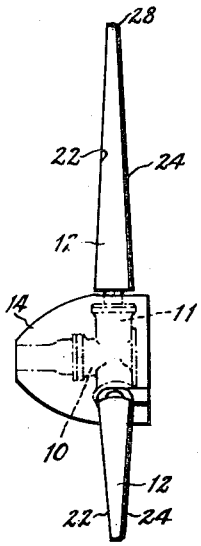
Fig.1a
Fig.1
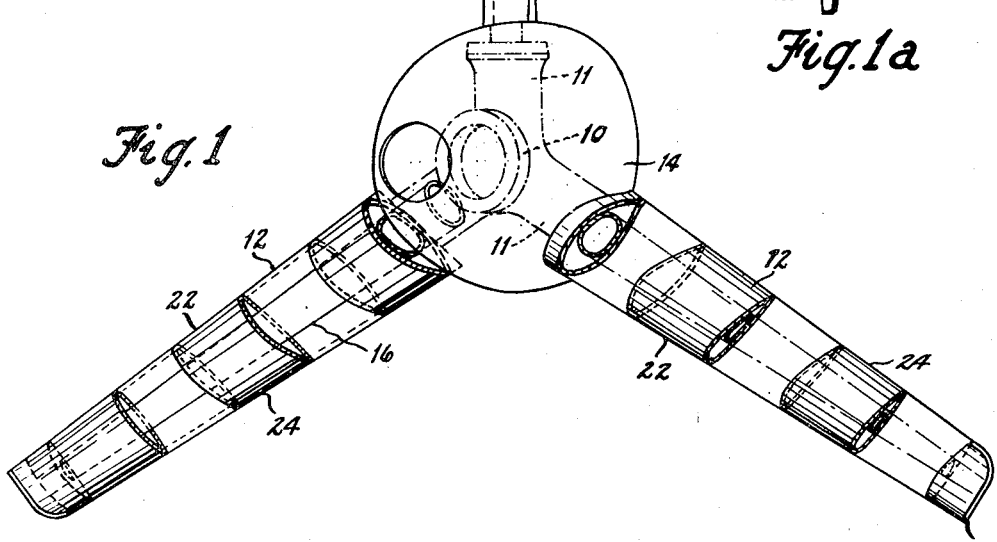
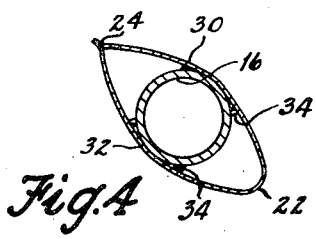
Fig.4  Fig.5  Fig.6
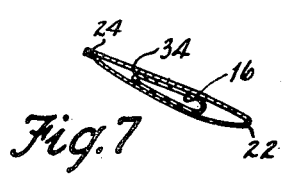  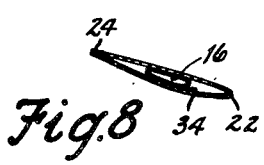
Fig.7  Fig.8
INVENTORS
THOMAS BRAGDON
CHARLES S.J. MacNEIL
JOSEPH STUART III
THOMAS WILLIAMS
Spencer, Hardman & Fehr
ATTORNEYS March 22, 1949. T. BRAGDON ET AL 2,465,007
AIRCRAFT PROPELLER
Filed Jan. 5, 1944 2 Sheets-Sheet 2
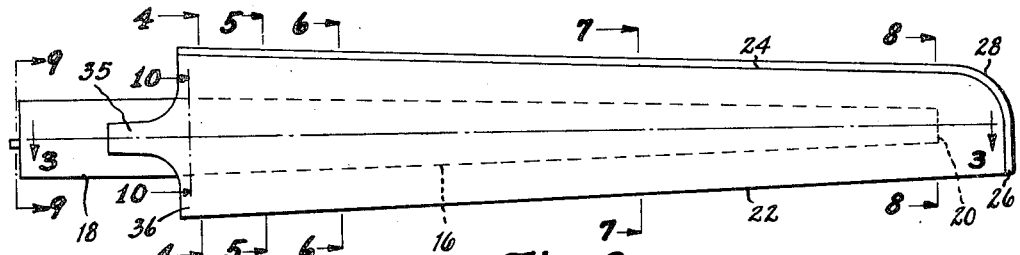
Fig.2
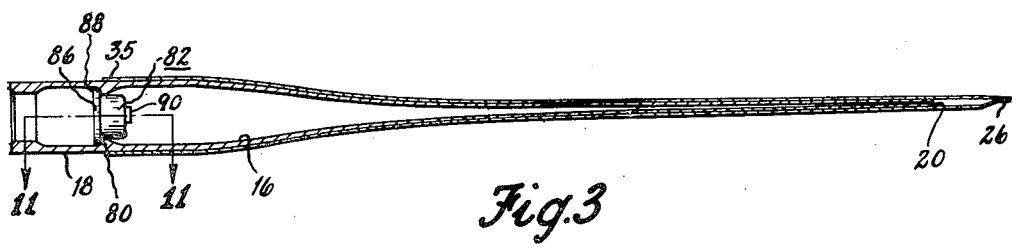
Fig.3
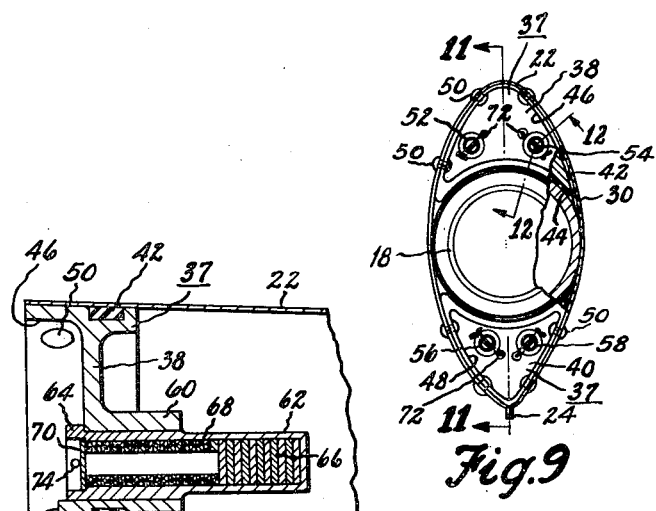
Fig.9
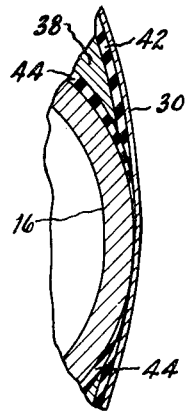
Fig.10
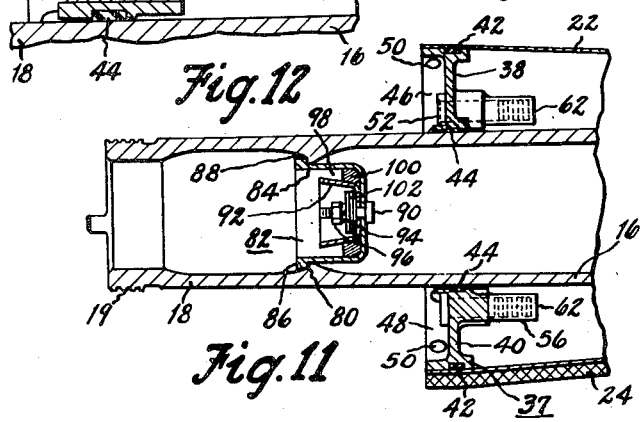
Fig.12
Fig.11
INVENTORS
THOMAS BRAGDON
CHARLES S.J. MACNEIL
JOSEPH STUART III
THOMAS WILLIAMS
Spencer, Hardman & Fehr
Their ATTORNEYS Patented Mar. 22, 1949

2,465,007

UNITED STATES PATENT OFFICE 2,465,007

AIRCRAFT PROPELLER

Thomas Bragdon, Charles S. J. MacNeil, Joseph Stuart, III, and Thomas Williams, Dayton, Ohio, assignors to General Motors Corporation, Detroit, Mich., a corporation of Delaware Application January 5, 1944, Serial No. 517,134

4 Claims. (Cl. 170—159)

This invention relates to propeller blades for aircraft and their support by hub structures, with spinner for completing the fairing and streamlining by which propeller hubs and blades are united, and fashioned to reduce the wind resistance to movement of the craft through the air.

One of the principal objects of the invention is to provide a unitary structure consisting of a plurality of blades and a hub rotatably mounting them, characterized by streamlining of the entire length of the blades and their confluence with the hub by an air-piercing cone or spinner completely enclosing the hub and all but the airfoil sections of the blades.

One object of the invention is to provide a blade of simple construction that may be fabricated with a minimum of cost, and that will operate with increased efficiency.

Another object is to provide a blade that is built up from a minimum number of parts that are easily fabricated, yet are structurally strong and efficient.

Another object is to provide a blade capable of pitch shift movement that maintains a general airfoil sectional contour from tip to root and hub, or to the juncture with a hub enclosing spinner such that propulsive force is produced by all portions of the exposed blade.

Another object is to provide a blade having a strong thrust receiving member covered by a sheath of light gauge metal presenting a large thrust area.

Another object of the invention is to provide a composite propeller blade whose component parts are joined by elastic bonding means so that stress concentrations are avoided in the component parts, and secure bonding thereof maintained.

Yet another object is to provide a hollow blade comprising a light weight spar, a light weight sheath, and a bulkhead providing a plurality of balance stations so that the blade may be preloaded to satisfy any one of a plurality of requirements as to the location of the center of mass.

A still further object is to provide balance means for a hollow blade construction that may operate to orient the location of center of mass for the blade.

Another object is to provide balance means whereby the center of mass may be located selectively around the reinforcing spar by which the blade is supported.

Yet another object of the invention is to provide a main balance cup at the axis of the blade for regulating the horizontal balance and coordinating it with associated blades, and auxiliary balance cups accessible after the blade is mounted and assembled for regulating the vertical balance of the blade.

Further objects and advantages of the present invention will be apparent from the following description, reference being had to the accompanying drawings wherein a preferred embodiment of the present invention is clearly shown.

In the drawings:

Fig. 1 is a perspective view showing the blade of the instant invention mounted in a hub with streamlining perfected by juncture with a spinner enclosing the hub.

Fig. 1a is a side elevation of the same illustrating certain features of the invention.

Fig. 2 is a view in plan form of one of the blades shown in the assembly of Fig. 1.

Fig. 3 is a longitudinal sectional view of the blade substantially as indicated by the line and arrows 3—3 of Fig. 2.

Figs. 4 to 8 inclusive, are transverse sectional views through the blade looking toward the tip, substantially as indicated by the lines and arrows 4—4, 5—5, 6—6, 7—7, and 8—8 respectively, of Fig. 2.

Fig. 9 is an end view of the blade with parts broken away substantially as indicated by the line and arrows 9—9 of Fig. 2.

Fig. 10 is an enlarged detail in section substantially as indicated by the line and arrows 10—10 of Fig. 2.

Fig. 11 is a sectional view of a portion of the blade substantially as shown by the line and arrows 11—11 of Fig. 3, and Fig. 9.

Fig. 12 is an enlarged sectional view through one of the auxiliary balance stations substantially as indicated by the line and arrows 12—12 of Fig. 9.

Fig. 13 is an enlarged view of part of Fig. 4, illustrating the resilient bond between the strut and sheath of the blade.

In aircraft propellers there has long been felt the need of a propeller construction that would characterize itself with simplicity of construction and at the same time have the properties of efficient operation, lightness in weight, capable of fairing with a hub enclosing spinner, and yet capable of pitch shift adjustment without introducing difficulties and handicaps far outweighing the advantages. The modern trend of blade forms, is to merge from a streamline section at the tip and outer portions of the blade into a cylindrical section near the root and about one-third of the length outward from the hub or socket retaining the blade. In that case no propulsive effect is gained from the blade at the juncture with the hub or spinner enclosing it. Applicants have found that a satisfactory blade can be formed by using a light-weight tubular spar for the thrust exerting member, and covering the spar with a light-weight folded sheet to give it the desired contour. The folded sheet lends itself to adoption of a straight taper blade from the tip to the meeting point with the spinner so that the blade will be characterized with straight leading and trailing edges which simplifies the blade fabrication and increases the active area of the blade as well as taking advantage of the full length of the blade for air movement and propulsive force. That construction also lends itself to location of a bulkhead at the radially inward end of the blade where balancing stations may be located for adjusting the balance of the blade and for changing its characteristics within desired limits. The need of and the difficulty in attaching auxiliary cuffs for perfecting the propeller blade fairing is also done away with.

A further consideration in the manufacture and use of propeller blades is the fact that the entire assembly when made up, whether the assembly consists of two, three, four or more blades, must balance about the axis of rotation. Care must therefore be exercised in balancing each hub, and each blade mounted in it. Balance of the hub is effected by adjustment of auxiliary devices scattered around the axis of rotation. Balance of the blades involves location of the center of mass at some particular line within the contour of the blade, and comprehends a three dimensional location on axes all at right angles to one another and intersecting at a designated or selected point. Consideration is then given to that which is usually known as the "horizontal balance" and the "vertical balance," which, when effected, and matched with the remaining blades of the same assembly, makes for exact balance of the propeller unit. Applicants have found that these balance requirements can in main be effected by the location of a main balance cup or assembly in the hollow root of the blade where it is secured against tampering or disorganization, and that refinements of balance can be effected by the location of auxiliary balance cups or assemblies in the bulkhead and scattered in circumferentially spaced relation, and so located that one experienced in the details of the procedure can accomplish the desired result. That construction lends itself to interchange of blades in the field, since the balance of a replacement blade may be made to agree with associated old blades without interfering with the original organization.

Referring particularly to the drawings, 10 refers to a propeller hub having radially extending and equally spaced sockets 11 within which blades 12 are secured in any desired manner. Surrounding the hub 10 is a spinner 14 that is of a diameter to cover the cylindrical portion of the blade 10 and closely approach the end of the sheath so that there will be proper fairing for the entire structure. The blade per se comprises a tubular strut 16 having a cylindrical root portion 18 adapted for the usual mounting in the hub and geared connection at 19 for pitch shifting movement. The tube 16 is essentially of tapered construction and is tapered in thickness from the root portion to the terminal end 20 at the tip of the blade and is also flattened from the cylindrical portion toward the tip so as to preserve the desired thickness of the blade throughout its length as well as to fill in the thickness spacing between the faces of the blade sheath all as is shown in the sectional views of Fig. 4 to Fig. 8 inclusive.

The sheath for the blade, or two face portions, is formed from a single sheet of metal by folding along its substantially medial line to provide a leading edge 22, from which it is wrapped over the tubular spar and the edges brought together in laminated or lapped relation for a trailing edge 24 where the edges of the sheet are bonded by brazing, welding or the like. The trailing edge bond may also be perfected by a thin elastic, or other rigid bond in the nature of a layer of elastic material. The ends of the folds beyond the tip 20 of the tube are pinched together as at 26, or otherwise closed, where they are similarly bonded to provide a closed tip. The juncture of the tip 26 and the trailing edge 24 is rounded off as indicated at 28 and there similarly bonded. There is then provided a blade sheath that has a relative flat thrust face 30 and a camber face 32 with comparatively straight leading and trailing edges 22 and 24, though the trailing edge plan form may be other than straight.

The sheath and spar so formed are assembled substantially as shown with their medial lines coinciding where they are secured in coupled relation by a rubber bond between the engaging surfaces of the spar and sheath substantially as shown in Figs. 4 to 8 and 13 by the reference character 34. The rubber bond between the spar and sheath is vibration proof in that it is resilient or elastic to the extent that it permits temporary deformation due to slight movement of the sheath relative to the spar in response to sudden shock or biasing force, but readily recoils or resumes the original position or shape without experiencing any injury or permanent deformation. A satisfactory bond is provided by coating with rubber cement the parts of the sheath to be juxtaposed and then assembling them with a strip of uncured rubber stock between them, whereupon the assembly is clamped together and brought up to temperature for vulcanizing and curing. A blade sheath and spar so bonded will withstand vibrations far in excess of those experienced in service without rupturing or showing any symptoms of failure. The same features may be secured by including a thin strip of cured rubber stock between the parts to prevent the occurrence of any thin spots or voids in the joint due to local pressure. In any event the spar and sheath are bonded by rubber in the order of 0.015" in thickness, or one that gives some appreciable flexibility in the joint.

The blade sheath when fashioned may include the tongue members 35 that extend from the faces of the sheath along the shank of the blade 18 where they are similarly bonded. They reduce local stress and afford better fastening of sheath at the inboard end, in that they reinforce the bond of the parts and prevent the wind or centrifugal force getting sufficient hold on the sheath to tear the sheath from the spar.

The base end 36 of the blade is desirably closed off by a bulkhead 37 somewhat as shown in Figs. 9 to 12 inclusive. To accomplish that, a couplet of dams 38 and 40 of generally triangular form and contoured to suit are used to fill in the space at the edge portions of the blade surrounding the cylindrical portion 18 of the spar, and are such peripherally grooved to partially receive a rubber or elastic strip 42 or 44. The strip 42 is disposed in the groove around the convex edge of the dam while the strip 44 is disposed in the groove along the concave edge of the dam. When so disposed, the assembled dams and strips are then placed in position at the base of the blade being first coated with rubber cement if desired. When properly located, holes are then drilled through the end of the sheath and a peripheral flange 46 or 48 of the dams 38 and 40 to receive rivets 50 by which the dams are held in place. When the rivets are set, the rubber strips 42 and 44 are placed under compression sufficient to isolate the interior of the blade. Thus, the base end of the blade is closed off by a bulkhead composed of a dam 38 on the leading edge side of the spar, and a dam 40 on the trailing edge side of the spar, where they are retained by the rivets 50 and prevented from vibrating or rattling by the cushioning strips 42 and 44. The dams being secured to the sheath only, with only a rubber cushioned engagement with the spar 18, the desired torsional resilience is maintained that is afforded by the resilient band at 34. Each of the dams is fashioned, such as by casting or moulding, to provide for a pair of balance cups arranged symmetrically with respect to a chord line of division passing through the center of the tube and the leading and trailing edge of the sheath. In Fig. 9 those stations are indicated by the reference characters 52 and 54 for the dam 38, and 56 and 58 for the dam 40.

Fig. 12 shows in enlarged section the structure of the balance station 54. In forming the stations the dam members are fashioned to provide the tubular bosses 60 within which is securely anchored a balance cup 62 having a flanged rim 64 engaging the body of the dam around the said boss 60. Within the cup 62 there is deposited the required number of lead or other heavy washers or discs 66 that will effect the blade balance desired. Then follow enough cork or other light weight members 68 to fill up the cup and secure the weight members 66 against shifting. With the addition of a final disc or cover member 70 the parts are retained in place by a cotter pin or key 72 disposed in cross bores 74 in the flange 64 of the cup. These provisions make for establishing the vertical balance of the blade, or that condition when the blade is suspended along its medial axis so that it will occupy a plumb position.

As heretofore stated, another consideration is the establishment of horizontal balance, in which the blade is adjusted to balance against a master while in the horizontal position and over a fulcrum situated at a definite distance or station from the axis of propeller rotation. Since that may involve the addition or removal of a relatively greater bulk of material, a single station at a definite position along the axis of the blade is selected for the lodgement of the main balance assembly. In the illustrated embodiment that location is determined as illustrated in Figs. 3 and 11, where the root portion 18 of the spar is provided with an interior flange or ledge 80 which may be integrally formed as shown or constitute a separate ring bonded in place by the aid of jigs. In either instance the flange forms a seat for a balance assembly 82 that includes a cup 84 of a diameter to frictionally pass within the bore of the flange and end in a radial flange 86 acting as a stop against the flange 80 where the parts are secured against removal by a suitable bond at 88. The balance assembly 82 is completed before securing in place by uniting to the geometric center of the cup 84 a threaded stud or bolt 90 that passes through the center of the cup and the center of a flared cup 92 to support a lock washer 94 and a nut 96, the cup 84, the bolt 90 and the flared cup 92 all being rigidly united in an integral fashion by a soldered or brazed or welded bond. The flared cup 92 intentionally increases its diameter from the bottom toward the rim so that there is provided within the cup 84 an annular chamber 98 whose inner perimeter is a tapered bore and makes for the mechanical lodgement of a bulk of lead 100 which may be cast in place while in the molten state. In general, and as an example, with the nut 96 and washer 95 tightened in place against the bottom of the flared cup 92, enough lead 100 is placed in the chamber 98 to effect balance against a master sag within 0.04 inch pounds for horizontal balance and 0.2 inch pounds for resultant vertical balance. For the purpose of bringing the balance for both horizontal and vertical conditions within prescribed tolerances, one or more balancing washers 102 may be clamped between the bottom of the flared cup 92 and the lock washer 94.

The main balance assembly 82 may give uniform horizontal and vertical balance. With respect to the vertical balance, that may, by intention or otherwise be truly axial or it may be slightly eccentric, and under all considerations may be finally attained by the use of the auxiliary stations 52, 54, 56 and 58. The symmetrical location of the balance stations 50 to 58 inclusive, about the axis of the spar, makes it possible to locate the center of mass of the blade either on the axis of the tube 16, or radially outward thereof and oriented in practically any direction around the axis of the tube. Should the blade stand at an angle to plumb, or be out of vertical balance while in the vertical position, then it may be righted by shifting one or more of the discs 66 from the heavy side to the light side of the blade, and a complemental change in the resulting number of fillers 68. To facilitate quick change and replacement of blades in the field, it is convenient to load each of the main balance assemblies with the same or equivalent mass to mate up with a master at the source of manufacture, incorporating some standard number of washers 102, such that in the replacement of a blade it may involve only removing the washers from the removed blade and installing them in the new blade. The design of the spar and the location and retention of the main balance assembly is such that there is still left a sufficient space within the root of the blade for the housing of a torque unit for the pitch shifting of the blade. Once installation is made it is seldom ever necessary to alter the balance effected by the main balance assembly, since the element of vertical balance can be effected by one or more of the auxiliary balance cups 52 to 58. It is in fact possible to adjust the balance effected by the stations 52 to 58 without removing the blade from the hub. Thus, applicants have made provisions for closely approximating blade balance by the main balance station 82 and then trimming the balance to close tolerances by the auxiliary balance stations 52 to 58 circumferentially spaced about the longitudinal or pitch shifting axis of the blade. That is particularly desirable since it is possible that loading of the cup 84 with the lead 100 may in fact render a blade having a center of mass slightly eccentric to the axis of the blade when it is desired to locate the center of mass on the said axis, or on the other hand the center of mass may be located axially when it is desired to be slightly eccentric. In either instance the auxiliary stations will bring the blade within the desired specifications. However, the eccentric location of the center of mass is not to be confused with the practice of locating a substantial mass far to one side of the pitch shifting axis, which usually involves a ball or enlargement on the end of a lever arm, and located outside of the blade contour.

While the embodiment of the present invention as herein disclosed, constitutes a preferred form, it is to be understood that other forms might be adopted, all coming within the scope of the claims which follow.

What is claimed is as follows:

1. A propeller blade comprising in combination, a tubular thrust exerting member, face plates secured to the thrust member and ending radially inward with a wide skirt of airfoil section, a part of which is disposed on either side of the thrust member, a bulkhead closing the skirt portion of the face plates comprising a pair of dams each disposed between the thrust member and the edge portions of the skirt, main balance assembly mounted axially of the thrust member, adjacent the skirt of the plates for effecting horizontal balance of the blade and trimming balance assemblies mounted in each of the dams for effecting vertical balance of the blade.

2. The combination set forth in claim 1 in which the dams are peripherally grooved to receive a resilient packing ring engageable and compressible by the skirt and thrust member when the dams are secured in place.

3. In a hollow propeller blade having a hollow spar extending the length of a hollow enveloping sheath and providing lineally extending channels between the spar and each edge of the blade, the combination of bulkheads closing the chambers at the shank end of blade, a balance assembly mounted within the tubular spar beyond the end of the sheath for effecting horizontal balance of the blade, and balance assemblies mounted in the bulkheads and circumferentially spaced about the tubular spar for effecting the vertical balance of the blade.

4. In an aircraft propeller a hollow propeller blade adapted for rotation, comprising in combination, a hollow elongated sheath provided with a closed tip portion and an open skirt portion radially inward of the tip portion, a strut member having a root portion for support of the blade and providing a spar portion extending into the sheath along the medial line of its length from skirt to tip and adapted to engage the inner surface of opposite sides of the sheath, tongue portions on the skirt of the sheath extending inboard of the tip along the medial line on opposite sides of the root portion of the strut, and means for securing the sheath to the spar portion and the tongues to the root portion to withstand centrifugal forces tending to tear the sheath from the spar during propeller rotation, said securing means consisting of a layer of resilient rubber-like material bonded to the coextensive portions of the spar and sheath, and the tongues and root by vulcanization, said spar and sheath bond of resilient rubberlike material absorbing the vibration incident to slight movement of the sheath relative to the spar, and withstanding without injury the shock of sudden biasing forces imposed upon centrifugal forces during propeller rotation, said tongue and root bond reinforcing the securing means between the sheath and spar at the skirt end of the sheath so as to prevent centrifugal force from tearing the sheath from the spar.

THOMAS BRAGDON.
CHARLES S. J. MacNEIL.
JOSEPH STUART, III.
THOMAS WILLIAMS.

REFERENCES CITED

The following references are of record in the file of this patent:

UNITED STATES PATENTS

| Number | Name | Date |
|---|---|---|
| 540,925 | Roy | June 11, 1895 |
| 1,346,508 | Olhovsky | July 13, 1920 |
| 1,789,240 | Leitner et al. | Jan. 13, 1931 |
| 1,852,146 | Carns | Apr. 5, 1932 |
| 1,880,313 | Charavay | Oct. 4, 1932 |
| 1,930,548 | Barbarou | Oct. 17, 1933 |
| 2,151,216 | Larsen | Mar. 21, 1939 |
| 2,262,163 | Brauchler | Nov. 11, 1941 |
| 2,235,605 | Bugatti | Mar. 18, 1941 |
| 2,289,400 | Woods | July 12, 1942 |
| 2,304,718 | Swart | Dec. 8, 1942 |
| 2,426,400 | Lampton | Aug. 26, 1947 |

FOREIGN PATENTS

| Number | Country | Date |
|---|---|---|
| 231,919 | Great Britain | Apr. 7, 1925 |
| 508,146 | Great Britain | June 27, 1939 |
| 546,176 | Great Britain | July 1, 1942 |